US010911106B2

(12) United States Patent
Zirwas et al.

(10) Patent No.: US 10,911,106 B2
(45) Date of Patent: Feb. 2, 2021

(54) FLEXIBLE REFERENCE SIGNAL DESIGN

(71) Applicant: Nokia Technologies Oy, Espoo (FI)

(72) Inventors: Wolfgang Zirwas, Munich (DE); Rakash Sivasivaganesan, Unterhaching (DE); Berthold Panzner, Holzkirchen (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/809,800

(22) Filed: Mar. 5, 2020

(65) Prior Publication Data

US 2020/0204220 A1    Jun. 25, 2020

Related U.S. Application Data

(63) Continuation of application No. 15/280,026, filed on Sep. 29, 2016, now Pat. No. 10,756,785.

(51) Int. Cl.
*H04L 12/801* (2013.01)
*H04L 5/14* (2006.01)
(Continued)

(52) U.S. Cl.
CPC ......... *H04B 7/0413* (2013.01); *H04B 7/0417* (2013.01); *H04B 7/0619* (2013.01);
(Continued)

(58) Field of Classification Search
CPC ..... H04B 7/0647; H04B 7/066; H04B 7/0421
See application file for complete search history.

(56) References Cited

U.S. PATENT DOCUMENTS 6,717,576 B1 *  4/2004  Duluk, Jr. ............... G06T 15/30
                                                                345/419
8,477,684 B2 *  7/2013  Khandekar .......... H04L 5/0053
                                                                370/328
(Continued)

FOREIGN PATENT DOCUMENTS

EP         2408235 A1    1/2012
WO    WO-2016/086971 A1  6/2016
(Continued)

OTHER PUBLICATIONS

R1-167520, 3GPP TSG RAN WG1 Meeting #86, "Comparison of beam-section and PMI-based schemes for NR MIMO", Lenovo, Aug. 2016, 5 pgs.
(Continued)

*Primary Examiner* — Faruk Hamza
*Assistant Examiner* — Abusayeed M Haque
(74) *Attorney, Agent, or Firm* — Harrington & Smith

(57) ABSTRACT

A radio network sub-tiles reference signals (RSs) within a set of resource elements (REs) such that each sub-tiled RS occupies less than a time and/or frequency and/or power extent of its respective RE. The set of REs are dispersed across both frequency bins and time slots according to a pre-defined grid; and transmitted. The user equipment (UE) uses that pre-defined grid to locate within that transmission the set of dispersed REs. The UE accumulates and combines at least one subset of the sub-tiled RSs and estimates therefrom a quality; then reports uplink an indication of that estimated quality. Examples of the RSs include channel state information RSs, beam RSs and beam refinement RSs. Advantages are particularly relevant for 5G new radio systems.

20 Claims, 9 Drawing Sheets

(51) Int. Cl.
*H04W 84/18* (2009.01)
*H04B 7/0413* (2017.01)
*H04B 7/0417* (2017.01)
*H04B 7/06* (2006.01)
*H04L 25/02* (2006.01)
*H04W 88/02* (2009.01)
*H04W 84/04* (2009.01)

(52) U.S. Cl.
CPC ....... *H04L 25/0226* (2013.01); *H04W 84/042* (2013.01); *H04W 88/02* (2013.01); *Y02D 30/70* (2020.08)

(56) References Cited

U.S. PATENT DOCUMENTS

| | | | |
|---|---|---|---|
| 8,559,567 B1 | 10/2013 | Pick | 375/259 |
| 10,306,589 B2 * | 5/2019 | Tang | H04L 65/105 |
| 2007/0165035 A1 * | 7/2007 | Duluk, Jr. | G06T 15/50 |
| | | | 345/506 |
| 2010/0111226 A1 * | 5/2010 | Ko | H04L 5/0023 |
| | | | 375/299 |
| 2010/0260154 A1 * | 10/2010 | Frank | G01S 5/10 |
| | | | 370/336 |
| 2010/0313094 A1 | 12/2010 | Kubota | 714/746 |
| 2011/0013581 A1 | 1/2011 | Lee, II | 370/329 |
| 2012/0020537 A1 * | 1/2012 | Garcia | G06T 7/246 |
| | | | 382/129 |
| 2012/0106472 A1 | 5/2012 | Rosa | 370/329 |
| 2013/0044727 A1 | 2/2013 | Nory | 370/330 |
| 2013/0058296 A1 | 3/2013 | Jitsukawa | 370/329 |
| 2013/0201853 A1 | 8/2013 | Perets | 370/252 |
| 2013/0315191 A1 * | 11/2013 | Yoshimoto | H04J 11/0056 |
| | | | 370/329 |
| 2014/0314128 A1 | 10/2014 | Li | 375/150 |
| 2015/0280888 A1 | 10/2015 | Karsi | 370/329 |
| 2016/0050006 A1 | 2/2016 | Ko et al. | H04B 7/0634 |
| 2016/0127922 A1 * | 5/2016 | Krishnamoorthy | H04W 24/02 |
| | | | 370/329 |
| 2016/0143055 A1 | 5/2016 | Nammi et al. | H04B 74/006 |
| 2016/0217547 A1 * | 7/2016 | Stach | G06T 1/005 |
| 2016/0277081 A1 | 9/2016 | Wei | |
| 2016/0341815 A1 * | 11/2016 | Thomas, Jr. | G01S 13/0209 |
| 2017/0141896 A1 | 5/2017 | Yang | |
| 2017/0193628 A1 * | 7/2017 | Sharma | G06T 3/0056 |
| 2018/0220386 A1 | 8/2018 | Tang | |
| 2019/0020451 A1 | 1/2019 | Zhang | |

FOREIGN PATENT DOCUMENTS

| | | |
|---|---|---|
| WO | WO-2016/099978 A2 | 6/2016 |
| WO | WO-2016/133376 A1 | 8/2016 |

OTHER PUBLICATIONS

Zirwas, W. et al., "Coded CSI Reference Signals for 5G—Exploiting Sparsity of FDD Massive MIMO Radio Channels", WSA 2016, 20$^{th}$ International ITG Workshop on Smart Antennas, Mar. 2016, pp. 45-52.

Ericsson, "Pooling of RS resources for CSI reporting", R1-167463, 3GPP TSG-RAN WG1 #86, Goteborg, Sweden, Aug. 22-26, 2016, whole document (3 pages).

Ericsson, "Unified CSI reporting framework", R1-167462, 3GPP TSG-RAN WG1 #86, Goteborg, Sweden, Aug. 22-26, 2016, whole document (5 pages).

\* cited by examiner

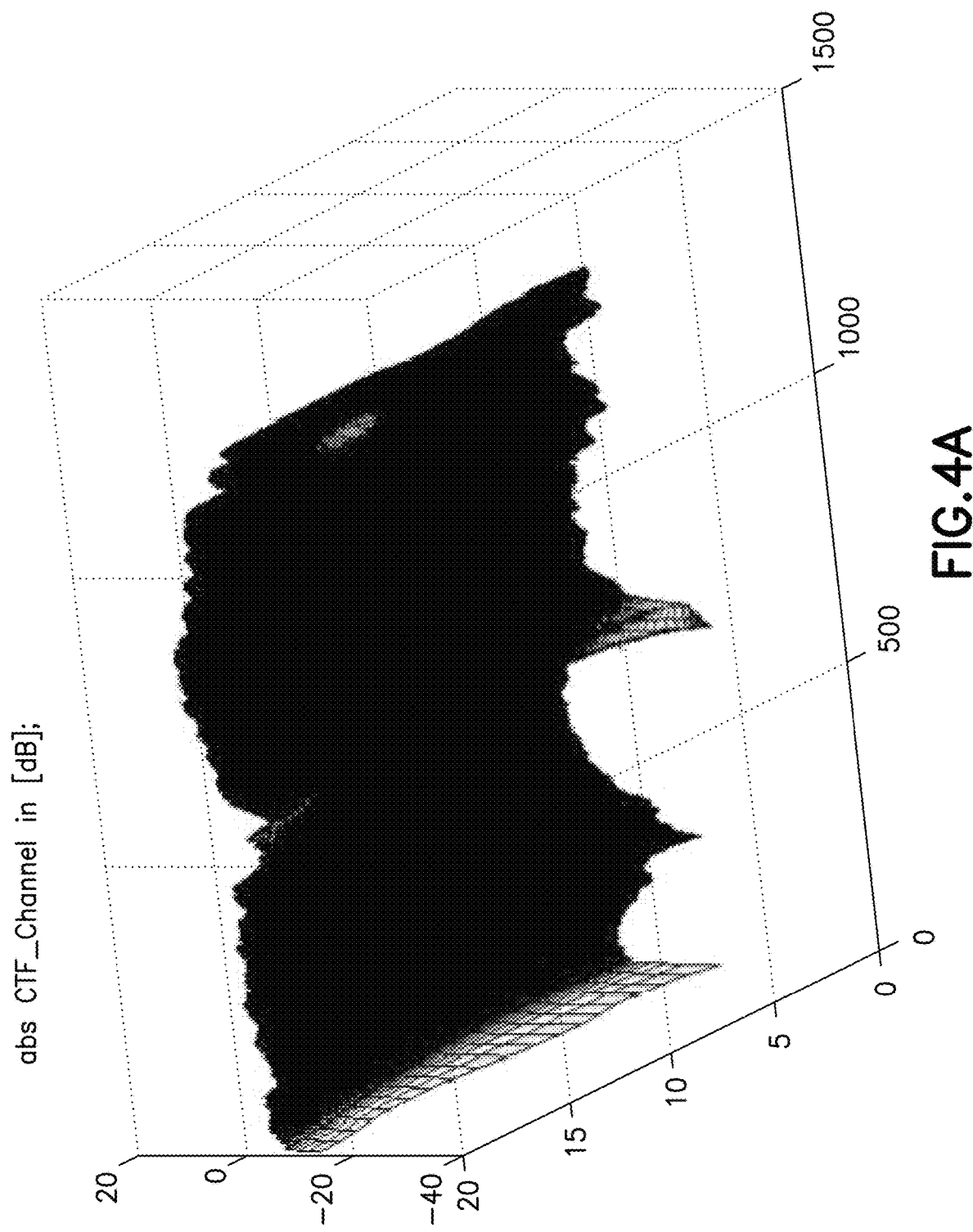

FLEXIBLE REFERENCE SIGNAL DESIGN

CROSS-REFERENCE TO RELATED APPLICATION

This application is a continuation of application Ser. No. 15/280,026, filed Sep. 29, 2016.

TECHNOLOGICAL FIELD

The described invention relates to wireless communications, and more particularly to the transmission and reception of reference signals used for channel estimation that can be flexibly combined at the user equipment side based on time coherence or frequency coherence of the user's channel.

BACKGROUND

Wireless radio access technologies continue to be improved to handle increased data volumes and larger numbers of subscribers. The 3GPP organization is developing 5th Generation (5G) wireless networks to handle peak data rates of the order of ~10 Gbps (gigabits per second) while still satisfying ultra-low latency requirements in existence for certain 4G applications. 5G intends to utilize radio spectrum on the order of GHz or more in the millimeter-wave (mmWave) band; the main target at this point is sub-6 GHz bands. 5G is also to support multiple input-multiple output (MIMO), and particularly massive MIMO with large antenna arrays.

In the development of the 5G system there has been discussion of the overhead for obtaining accurate channel state information (CSI). In this regard the following documents from the 3GPP TSG-RAN WG1 meeting #86 held in Göteborg, Sweden on 22-26 Aug. 2016 are relevant:

Document R1-167462 by Ericsson entitled *Unified CSI reporting framework*; and

Document R1-167463 by Ericsson entitled *Pooling of RS resources for CSI reporting*.

Mobile terminals (user equipment or UE) generally measure some kind of reference signal (RS) for this purpose but there are wide classifications for the various mobile users for which different types of RSs are suitable. Radio channels often experience either a large coherence bandwidth or a large coherence time. Equivalently one can say radio channels are either frequency flat versus frequency selective or stable over time versus time variant. Typically fast moving UEs with high Doppler are in cars or other vehicles moving on a highway and which include more frequency flat radio channels due to the lower number of close by radiofrequency (RF) reflectors. On the contrary frequency selective radio channels are typically the result of urban non-line-of-sight (NLOS) scenarios where there is a large number of buildings nearby that act as RF scatterers, and which inherently leads to speed limited cars (<50, 60 or possibly 80 kmh on the high side). This class includes nomadic (pedestrian) UEs moving at only a few kilometers per hour.

In the LTE (4G) radio access technology there are two types of RSs that are relevant here for downlink CSI estimation. For nomadic users there are so called channel state information or CSI RSs; these are transmitted sparsely in frequency and time (for example, only every 5 to about 180 ms—this value is configured semi-statically). Each physical resource block (PRB) in LTE uses 40 resource elements (REs) for the support of up to 8 antenna ports so that the overall overhead remains in the low percentage range with a relatively good interpolation in the frequency direction, for example one value per PRB of 180 kHz.

LTE supports high speed UEs (up to 250 km/h) using common reference signals (CRSs) that the eNBs transmit in every PRB. This continuously generates a very high reference signal overhead of 5 to 10%, even if a cell contains only static users (indoor cells for example). Further, in multi-cellular environments CRSs provide only wideband channel information because different cells are orthogonalized by different Zadoff Chu sequences being spread over the full frequency bandwidth.

Merely combining CSI-RSs and CRSs to account for the different types of UEs, as the LTE systems does for certain transmission modes, adds to the signaling overhead. 5G is an opportunity to re-think that approach and one of the current 5G development goals is for an inherently flexible channel-estimating reference signal design that combines low to moderate overhead with support of a mixture of users where some have a high time variance (represented by fast moving UEs on a highway or train) and others have a high frequency selectivity (represented by nomadic users in a NLOS urban macro scenario). As detailed particularly below these teachings address that goal in a particularly elegant way. Though the examples are in the context of 5G these teachings have broader applications beyond only that radio access technology.

These aspects and others are detailed further below with particularity.

SUMMARY

According to a first aspect of these teachings there is a method that includes sub-tiling reference signals (RSs) within a set of resource elements (REs) such that each sub-tiled RS occupies less than a time and/or frequency and/or power extent of its respective RE; dispersing the set of REs across both frequency bins and time slots according to a pre-defined grid; and wirelessly transmitting the dispersed set of REs.

According to a second aspect of these teachings there is an apparatus such as a radio access node comprising at least one computer readable memory storing executable computer program instructions and at least one processor. The computer readable memory With the computer program instructions is configured, with the at least one processor, to cause the apparatus to at least: sub-tile reference signals (RSs) within a set of resource elements (REs) such that each sub-tiled RS occupies less than a time and/or frequency and/or power extent of its respective RE; disperse the set of REs across both frequency bins and time slots according to a pre-defined grid; and wirelessly transmit the dispersed set of REs.

According to a third aspect of these teachings there is a computer readable memory storing computer program instructions that, when executed by one or more processors, cause a radio access node to perform actions comprising: sub-tiling reference signals (RSs) within a set of resource elements (REs) such that each sub-tiled RS occupies less than a time and/or frequency and/or power extent of its respective RE; dispersing the set of REs across both frequency bins and time slots according to a pre-defined grid; and wirelessly transmitting the dispersed set of REs.

According to a fourth aspect of these teachings there is a method comprising: receiving a transmission on a downlink channel; using a pre-defined grid to locate within the transmission a set of resource elements (REs) that are dispersed across both frequency bins and time slots of the transmission, each RE of the set comprising a sub-tiled reference signal (RS) that occupies less than a time and/or frequency and/or power extent of its respective RE; accumulating and combining at least one subset of the sub-tiled RSs and estimating therefrom a quality; and reporting uplink an indication of the estimated quality.

According to a fifth aspect of these teachings there is an apparatus such as a user equipment comprising at least one computer readable memory storing executable computer program instructions and at least one processor. The computer readable memory with the computer program instructions is configured, with the at least one processor, to cause the apparatus to at least receive a transmission on a downlink channel; using a pre-defined grid to locate within the transmission a set of resource elements (REs) that are dispersed across both frequency bins and time slots of the transmission, each RE of the set comprising a sub-tiled reference signal (RS) that occupies less than a time and/or frequency and/or power extent of its respective RE; accumulate and combine at least one subset of the sub-tiled RSs and estimate therefrom a quality; and report uplink an indication of the estimated quality.

According to a sixth aspect of these teachings there is a computer readable memory storing computer program instructions that, when executed by one or more processors, cause a radio access node to perform actions comprising: receiving a transmission on a downlink channel; using a pre-defined grid to locate within the transmission a set of resource elements (REs) that are dispersed across both frequency bins and time slots of the transmission, each RE of the set comprising a sub-tiled reference signal (RS) that occupies less than a time and/or frequency and/or power extent of its respective RE; accumulating and combining at least one subset of the sub-tiled RSs and estimating therefrom a quality; and reporting uplink an indication of the estimated quality.

These and other aspects are detailed further below with particularity.

BRIEF DESCRIPTION OF THE DRAWINGS

FIG. 4A is a time domain plot of test data showing inter-code interference and channel estimation error for different UE speeds utilizing a fifth implementation for sub-tiling CSI-RSs according to these teachings.

DETAILED DESCRIPTION

Figure 1:
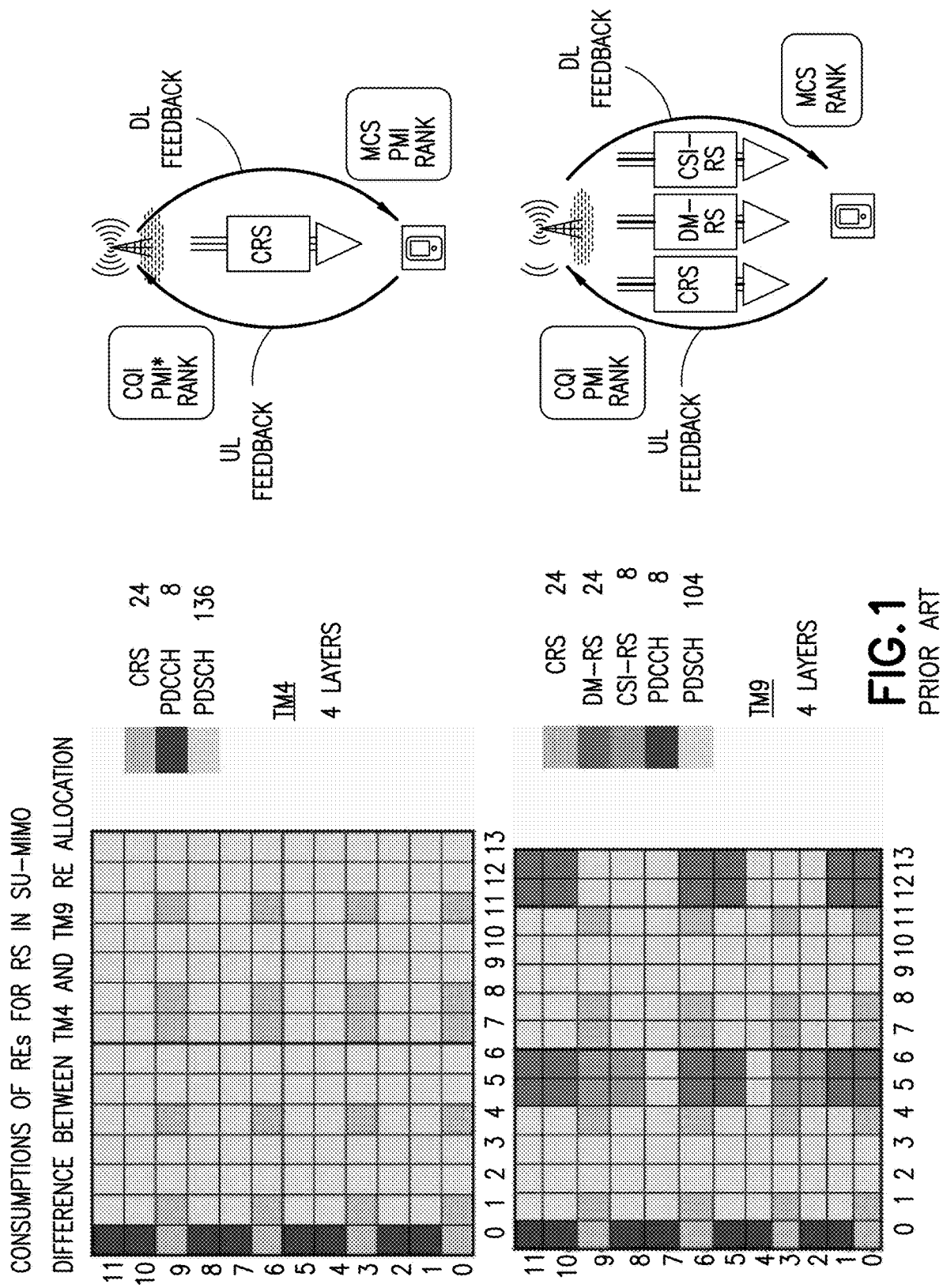
FIG. 1 illustrates a prior art grid of RE allocations in a PRB for different LTE transmissions modes.

To better appreciate the teachings described herein and how they advance over the most relevant prior art, first are presented additional details of the CST-RS and CRS regimens in the LTE radio access technology. In general, to simply transmit downlink both CRS and CSI RSs means a duplicated measurement (by different UEs) of the same radio channel. There has long been discussions in the LTE community how to avoid the overhead for CRSs since they are almost useless for nomadic users doing channel estimation based on CSI RSs. FIG. 1 is a prior art grid of RE allocations in a PRB for different LTE transmissions modes showing the RS overhead usage. Transmission mode 4 (TM4) has RS allocations only for CRSs while TM9 has RE allocations for both CRS and CSI-RS (as well as demodulation references signals DM-RS). There are also illustrated REs allocated for scheduling (the Physical Downlink Control Channel PDCCH) and for data (the Physical Downlink Shared Channel PDSCH). Other acronyms in FIG. 1 are SU-MIMO (single-user MIMO), PMI (precoding matrix index), MCS (modulation and coding scheme), DL (downlink) and UL (uplink). FIG. 1 reveals the general problem lies in the frame structure of LTE: the inflexible use and occupation of the various RSs (all these different RS serve the same broad purpose) reduces the available REs for data transmissions. There are a total of 168 REs in each of the PRBs shown at FIG. 1, and for TM9 with 4 antenna ports only 108 REs out of that total 168 REs can be used for data symbols. This represents a 35% control signalling overhead. This high control overhead is on top of the reduced performance of TM9 as compared to TM4 (all other things being equal) due to the additional REs allocated for CSI-RS and DM-RS).

The development of 5G (termed in 3GPP discussions at this time as a 'new radio (NR) system') is currently proceeding from a general understanding that CRS signals should be avoided, and that overhead and energy efficiency issues should be taken into account so that all channel measurements should rely on as-yet undefined CSI-RSs. There is also the likelihood that 5G will further DM-RSs but those RSs are not particularly relevant to the description below and so will not be further discussed. Simply re-adopting the LTE design into 5G will not solve the high CSI-RS overhead problem because LTE's high repetition rate in time and frequency is large to ensure sufficient quality (accuracy) in the channel estimations. Reducing that repetition rate would degrade that quality for high speed UEs and/or for UEs experiencing frequency selective radio channels.

Some possible solutions that were presented in RAN1 meeting #86 are mentioned above in the background section and these generally rely on some form of user grouping such that high speed UEs with very time variant radio channels are pooled into one 'basket' and nomadic users with potentially highly frequency selective radio channels are pooled into another basket. For each group or pool of UEs, properly adapted reference signals will be transmitted in pre-defined frequency sub-bands or time slots. Specifically, RAN1 meeting #86 set forth the following two agreements (among others) that are relevant to these teachings:

Strive to design a unified CSI framework, avoiding introducing multiple classes/subclasses and redundant (equally performing) configurations, while still covering a wide variety of use cases and frequency bands.

Study flexible scheduling/configuration of CSI-RS, CSI report and transmission method/scheme for data and control signaling.

RAN1 meeting #86 does allow for flexible CSI configurations, but the teachings herein present a unified CSI framework that offers broad advantages over UE pooling concepts. There are several challenges for the general concept of pooling UEs for CSI-RS purposes:

i) It is not really a unified framework and will require many reconfigurations in the case of flexible scheduling of a multitude of UEs with diverging channel characteristics.

ii) From a theoretical point of view channel estimation quality increases with increasing measurement bandwidth (increased Fisher information and according lower Cramer Rao Bound for the mean square estimation error), while the pooling of resources will tend to decrease the measurement bandwidth for the pooled UEs.

iii) CSI configuration needs to be adapted to the future scheduling decisions, meaning scheduling on short notice will be challenging so there will be some extra latency in a practical system for the reconfiguration.

iv) UEs will constantly need to be informed via additional control messages about the CSI RS re-configurations, at least for the case of varying the size of the pool.

v) The varying CSI-RS configurations are a potential source of mis-alignment between the eNB and the UEs it controls, and this is especially true when the rate of UE reconfigurations is high.

The signaling regimen detailed herein provides a single set of CSI-RSs that support a variety of users (distinguished with respect to their mobility patterns) while still enabling accurate CSI measurements and estimations based on a single set of CSI RSs. As will be detailed below, this signalling regimen for the single set of CSI-RSs does not require pooling of UEs into different mobility-type groups for CSI-RS purposes, but instead provides an inherently self-adapting CSI-RS solution.

The CSI-RSs according to these teachings are allocated in what is described herein as RE sub-tiles. A RE sub-tile represents only a portion of the overall RE, and so defining these sub-tiles in a certain way enables the CSI-RS to be placed in one sub-tile but less than all sub-tiles of a given RE, leaving the remaining sub-tiles available for other signaling such as user data or other control information. These CSI-RS sub-tiles can be flexibly combined at the UE to make a good channel estimation in either the time direction or in the frequency direction. One advantage of sub-tiling CSI-RSs is that it enables flexibility for the different types of UEs in the cell, and this sub-tiling enables a low overhead to be allocated for the CSI-RSs overall. Sub-tiling of RSs enables the transmission of RSs to be dense in time and frequency so that UEs can estimate fast time varying as well as very frequency selective radio channels with high accuracy.

For the examples herein the sub-tiles are defined such that one sub-tiled CSI-RS occupies exactly one sub-tile of a given RE since for these examples that is the only purpose of sub-tiling the REs. For example, if one full CSI-RS is divided amongst 4 REs, each of those REs may be considered to be divided into 4 sub-tiles with ¼ of the full CSI-RS occupying one sub-tile in each of the 4 different REs. As these teachings are more widely adopted and adapted there may be other uses for sub-tiling in which case one sub-tiled CSI-RS in a given RE might occupy more than one but still less than all sub-tiles of a given RE. For example in the above example it may be that each RE defines 8 sub-tiles in which case exactly 2 of those 8 sub-tiles per RE would be occupied by ¼ of the full CSI-RS. As another example, further below with reference to FIG. 2B are additional examples where sub-tiling is used for beam reference signals and beam refinement reference signals and it is advantageous in certain cases to have multiple sub-tiled beam refinement reference signals within a given RE.

To illustrate the overhead advantage in sub-tiling for CSI-RS, consider an example where we simply extend the LTE frame structure of FIG. 1 to achieve an allocation of CSI-RSs with high density in time and frequency. Combining for example the time domain density of the CRSs with the frequency density from the CSI RSs from LTE would result in an overhead of 4 RS per PRB multiplied by 40 REs for CSI-RS per PRB, yielding 160 REs per PRB for reference signals. But as FIG. 1 shows, in LTE a single PRB has overall 168 REs, and so simply extending the LTE protocol for CRS and CSI-RS as above time and frequency density would be a very high overhead (almost 100%).

Because the size of the RE sub-tiles can be defined differently, begin with the design criteria that we wish to limit overhead for the CSI-RSs to about 5 or 6%. Keeping with the density in the above example where the LTE regimen was merely extended, that means we need to reduce the overhead by a factor of 16. The sub-tiling may divide each RE that carries a CSI-RS into sixteen sub-tiles. Specific for 5G which is to use OFDMA, one full 'tile' (which would be one RE) is defined as one OFDM subcarrier and a sub-tile would use only part of the spectrum used for a single subcarrier. Similarly the used time might be reduced to a fraction of an OFDM symbol.

This division into time and frequency sub-tiles also implies a division of the RE's transmit power among the sub-tiles. So for example if a RE is divided by transmit power into 16 sub-tiles, the total transmit power for each sub-tile of this RE is 1/16 of the total transmit power for the entire RE. This directly impacts the accuracy of channel estimation. The CST estimation quality will obviously suffer due to the lower power and the lower resource usage per time/frequency sub-tile as compared to a prior art CSI-RS that occupies one full RE. In this regard, the network is transmitting sub-tiled CSI-RSs with a high density in time and frequency, and the UEs can combine these sub-tiled CSI-RSs in order to collect sufficient power for channel estimation. So for example if the REs are divided into 16 sub-tiles and each CSI-RS occupies on such sub-tile, the UE can accumulate 16 sub-tiled CSI-RSs to result in the equivalent of one full prior art CSI-RS that occupies one full RE. The UEs can do their own individual combining without specific instructions from the network on which sub-tiled CSI-RSs they should accumulate and combine, and the UEs' accumulation can be either in the frequency or in the time direction. Accumulation over power is inherent when the UE accumulates the sub-tiled CSI-RSs.

As will be detailed further, it is preferred the UE accumulate and combine all the sub-tiled CSI-RSs that are in a PRB so it can get the most accurate channel estimate, but where the overall PRB has what totals more than a single CSI-RS all these different CSI-RSs will be accumulated and combined as different subsets of the sub-tiled CSI-RSs of the PRB.

Use of the term PRB herein is to simplify the explanation of sub-tiling; in fact the 5G system or other radio access technologies yet to be developed may or may not employ a transmission concept similar to the 4G PRBs. Both the access node transmitting the RE's with the sub-tiled CSI-RSs and the UE's that receive them will utilize a common grid that stipulates the locations of the set of REs that have the sub-tiled CSI-RSs. Such a grid may be pre-defined in a published radio access technology specification or it may be pre-defined by signaling from the access node to its UEs. If one were to sub-tile as described herein in a 4G system the grid would be repeated in consecutive PRBs, or it may be more efficient to have the grid span multiple RPBs in which case the grid repeats every pre-defined number X of PRBs. Since 5G may or may not employ PRBs, consider that the grid spans one transmission basis and is repeated in consecutive transmission bases, where a given transmission basis is defined by some pre-defined bounds to time (such as number of symbols) and frequency (such as number of subcarriers). The transmission basis may be defined by the radio access technology itself to be uniform across all access nodes in which case the pre-defined grid would be published, or it may be decided by the radio network based on the current channel conditions in which case the pre-defined grid would be signaled.

Figure 2A:
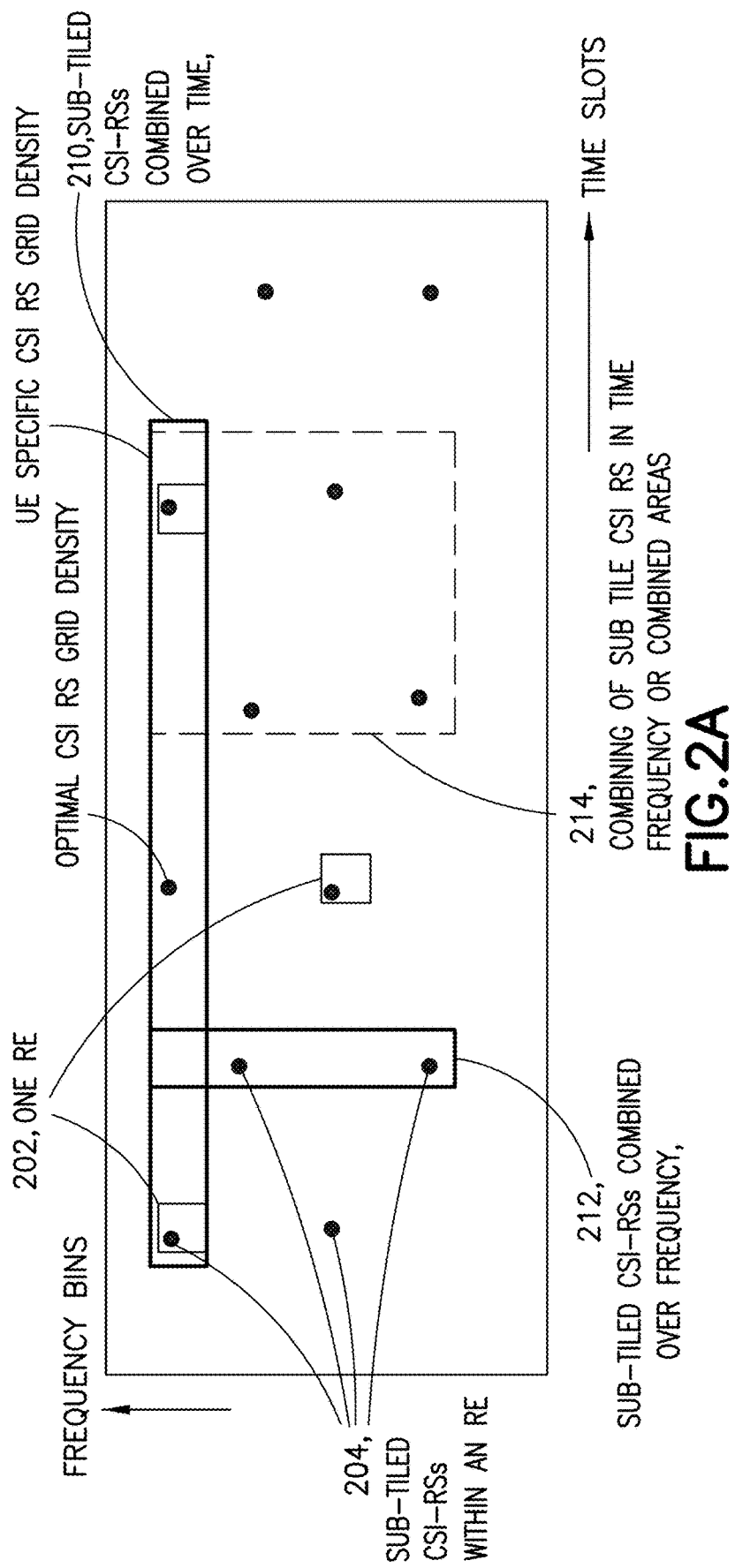
FIG. 2A is an illustration of one PRB and illustrating sub-tiled CSI-RSs as dots that are spread in time and frequency, each of which occupies less than a full RE represented by the example rectangles, according to an embodiment of these teachings.
Figure 2B:
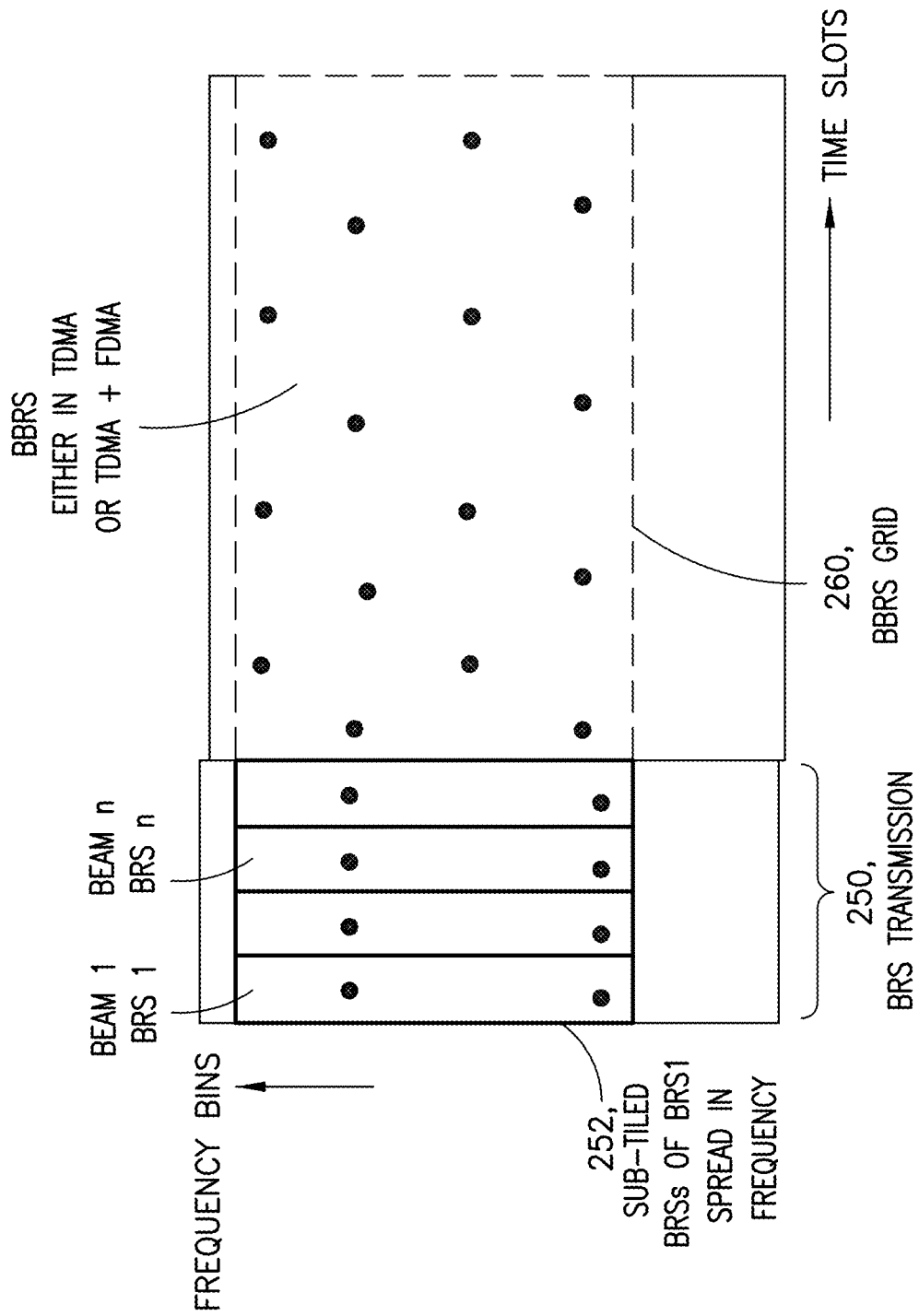
FIG. 2B is a plan view similar to FIG. 2A but illustrating an example for applying sub-tiling to beam reference signals (BRS) and beam refinement reference signals (BRRS).

The general principle of the pre-defined grids and accumulating/combining sub-tiled CSI-RSs over subsets is illustrated at FIG. 2A where the transmission basis is a square defined by a certain frequency bandwidth and a certain time window, which as mentioned above might be subdivided into subcarriers and symbols as known from LTE. As shown frequency bins are along the vertical axis and time is along the horizontal axis. The grid of sub-tiled CSI RSs is defined by the physics of the channel, so that the highest frequency selectivity as well as the highest UE mobility should be supported by strategic placement of the sub-tiled. CSI-RSs. In FIG. 2A the dots represent the sub-tiled CSI-RSs 204, and one full RE 202 (defined in this example by one subcarrier and one symbol length) is illustrated as a square. The smaller size of the sub-tile dots 204 compared to the full-RE squares 202 indicate the reduced resource usage. In FIG. 2A all the dots represent an optimal density and placement of the sub-tiled CSI-RSs 204 and all these sub-tiled CSI-RSs are of course each within one full RE 202, but the three full-RE squares specifically illustrated at FIG. 2A show the prior art sparse allocation of (full-RE) CSI-RSs for contrast against the higher density of the sub-tiled CSI-RSs 204 dots.

FIG. 2A illustrates one transmission basis. Periodically but less seldom than every transmission basis the network may transmit full sets of CSI-RSs similar to the prior art 4G approach (e.g., one CSI-RS occupying one till RE). This will be less frequent than in 4G and will not add too much to the overall RS overhead, but will enable UEs to know their channel conditions so as to decide individually which sub-tile CSI-RSs to accumulate and combine. For some UEs it will be more appropriate to combine multiple sub-tiled CSI RSs in the time domain as shown by the rectangle 210 identifying a symbol-wise spread of sub-tiled CSI-RSs; for other UEs it will be more appropriate to combine multiple sub-tiled CSI RSs in the frequency domain as shown by the rectangle 212 identifying a frequency-wise spread of sub-tiled CSI-RSs, and for still other UEs it will be more appropriate to combine sub-tiled CSI-RSs in the time and frequency domains as shown by the rectangle 214.

Each of the different rectangles 210, 212 and 214 represents a subset of all the sub-tiled CSI-RSs in the transmission basis that FIG. 2A illustrates. Preferably individual UEs will accumulate and combine all of the sub-tiled CSI-RSs per transmission basis using multiple distinct but similar subsets. So for example the UE that accumulates and combines over time using subset 210 will also accumulate the remaining 9 sub-tiled CSI-RSs of the FIG. 2 transmission basis using 3 additional subsets each consisting of exactly 3 sub-tiled CSI-RSs, and each subset will be across time similar to rectangle 210.

In this manner the same commonly broadcasted grid of sub-tiled CSI-RSs in each transmission basis simultaneously supports UEs with different channel characteristics, quite unlike the UE-pooling/grouping options that are also being considered for 5G and discussed in the background section above. For nomadic or low mobility users this sub-tiling approach allows frequency selective channel estimation as with the combination at rectangle 212, while also allowing fast moving UEs to follow fast varying radio channels as long as either the coherence time or frequency bandwidth is sufficiently large.

This common transmission of sub-tiled CSI-RSs by the network is met on the UE-side by UE-specific combining of sub-tiled CSI RSs so as to provide combined CSI-RSs that are either sparse in time or in frequency per subset. Referring to FIG. 2A, the sub-tiled CSI-RSs in rectangles 212 and 214 are sparse in time while those in rectangle 210 are sparse in frequency. UE-specific combining means that the sub-tiled CSI-RSs are so defined or generated to allow either combining in frequency direction per subset (rectangle 212), thereby enabling dense CSI estimation in the time domain; while also allowing combining in the time direction per subset (rectangle 210), which enables accurate CSI estimation in the frequency domain.

These example embodiments provide certain technical effects. Firstly, sub-tiling of CSI-RSs as detailed above provides a unified CSI-RS framework combining low overhead (in the range of 5% for the above example) together with accurate CSI estimation either in the time domain or in the frequency domain. Secondly, sub-tiling CSI-RSs allows all UEs to estimate constantly (each PRB) their own individual radio channels in the best way. This approach allows a single type of reference signaling for fast moving as well as frequency selective radio channels. It particularly also supports the random access channel (RACH) procedure fox the UE to establish a connection with the network because both nomadic and fast moving UEs can do channel estimation based on sub-tiled CSI-RSs. Another technical effect is that UEs with different channel conditions can be served simultaneously, and each such UE can inherently adapt their effective combined CSI-RSs to their needs, which allows fully flexible scheduling of UEs into resources.

On the UE side another technical effect is that each UE can exploit the CSI measurements from the whole frequency bandwidth as well as the whole time duration as they see appropriate so that the channel estimation performance is maximized. This is anticipated to be especially important for future deployments of new radio access technologies which, if past trends continue, increasingly rely on accurate channel prediction. Channel prediction often requires long-term channel observations to learn the channel evolution, which would otherwise be difficult to implement for varying CSI configurations over time and frequency. Relatedly, UEs can do their channel estimation at any time instant and frequency band, thus providing the network with full scheduling flexibility and avoiding any pre-configuration latency and accompanying control channel issues.

From a system wide perspective, another technical effect of these teachings is that the sub-tiled CSI-RS concept simplifies the decoupling of control, broadcast and data planes, which is one of the 3GPP targets for 5G. Specifically, there are no control overhead and ambiguities with respect to CSI-RS grids which will be common for all UEs (even though different UEs will combine different subsets of the sub-tiled CSI-RSs on the grid that repeats in consecutive transmission bases). And further there is no performance loss due to mismatch of users to pools/groups with the wrong CSI-RS configurations, which as mentioned above is an inherent issue with practical deployments of the UE pooling concept.

With the above understanding of the general concept of sub-tiling CSI-RSs and arranging them in a grid so as to be spread across both time and frequency in a given transmission basis as FIG. 2A demonstrates, now are presented further implementation details for OFDM and 5G, which are examples and not limiting to the broader teachings herein.

Respecting the generation of the sub-tiling which is how these teachings reduce resource usage as compared to a single resource element as defined for LTE, there are different options to implement this. One challenge is the physical limitation of OFDM signals, which do not allow one to reduce the grid in time as well as the frequency simultaneously. A finer frequency resolution with more subcarriers will end up in a longer symbol length, and vice versa. In that regard the dots with small time and frequency dimensions representing the sub-tiled CSI-RSs in FIG. 2A are a generalization of low resource usage per RE in a practical radio system. That generalization can be realized in several ways.

In a first implementation the sub-tiled CSI-RSs are an overlay code to the data transmissions, where the power between user data (or control data, whatever else occupies the other sub-tiles of the RE) and the sub-tiled CSI-RS is split for example by a factor of 1/16 or 1/8 depending on the granularity of the sub-tiling. A drawback for this first implementation is there will be some mutual interference between reference signals and data.

This mutual interference can be overcome in several different ways. For example long code sequences as known from CDMA systems with corresponding high coding gain can be used to reduce this mutual interference. But note that for high estimation accuracy the code length can become quite long because a 3 dB coding gain corresponds to a doubling of the coding length. In this case either the UE can decode the user plane data first (based on previous CSI estimations and/or DM-RSs) and subtract the estimated data signals from the received signals to get the sub-tiled CSI-RSs, or vice versa the UE can first subtract the sub-tiled CSI-RSs based on a channel prediction from previous CSI-RSs.

A second implementation utilizes a hierarchical coding where the sub-tiled CSI-RSs are essentially seen as small error signals on top of the data signals. Hierarchical coding is also known in the radio arts, and for example is used in NOMA systems. Hierarchical codes can be used in place of the overlay codes of the first implementation above, or can be used in conjunction with the overlay codes to reduce the mutual interference among sub-tiles of a given RE as mentioned above.

The 5G radio access technology is to support MIMO, massive MIMO and joint transmission cooperative multi-point transmissions, and to do so there will be a higher number of beams or antenna ports as compared to 4G. These beams/ports will of course need to be estimated and one solution to do so is to overlap these antenna ports on each resource element and to separate the different antenna ports by suitable orthogonal codes such as for example the well-known Hadamard codes. A third implementation extends this concept of separating the antenna ports via orthogonal codes to the sub-tiling of CSI-RSs with user data as described above, which beneficially avoids the mixing between the sub-tiled user plane data and the sub-tiled CSI-RSs. In general orthogonal codes allow for a more clean overall reference signal design. In the case of 16 overlapped antenna ports one would need length-16 Hadamard sequences to be able to separate all the codes/antenna ports at the receiver. Applying codes to reference signals is known to a certain extent, but new in these teachings is applying the Hadamard codes in the time direction as well as in the known frequency direction. This extension is what allows the UEs to decide, based on their coherence time and frequency, whether they want to decode in the time domain (rectangle 210 of FIG. 2A) or in the frequency domain (rectangle 212 of FIG. 2A) or in some combination of both (rectangle 214 of FIG. 2A).

Figure 3:
FIG. 3 is an exemplary allocation of orthogonal codes to antenna ports (AP1, AP2, AP3, AP4) where each element is one resource element used for sub-tiled CSI-RSs using a third implementation for sub-tiling CSI-RSs according to these teachings.

FIG. 3 illustrates one example of a suitable allocation of Hadamard codes to antenna ports for a 4 antenna-port system. UEs can now decode the 4 antenna ports by applying the four codes [1 1 1 1], [1 −1 1 −1], [1 −−1 1] or [1 1 −1 −1] to the received signal. Fast moving UE will apply the code over the resource elements in the frequency direction so that they get 4 channel estimates in the time domain, while nomadic users will apply it vice versa in the time direction so that they get 4 estimates in the frequency domain.

Alternatively in case of moderate speed UEs with moderate frequency selectivity, other combinations spreading over time and frequency are of course possible so long as these achieve full orthogonality between all 4 (or generally 8 or even 16) codes.

A fourth example implementation combines data and CSI-RSs at certain resource elements. Different from the other implementations above, in this fourth one the user plane data will be spreaded by similar orthogonal codes like Hadamard codes as mentioned above for sub-tiled CSI-RSs-so that user data and reference signals can be clearly separated at the UE. Note that the spreading of sub-tiled CSI-RSs might go over all resource elements of each PRB.

In a fifth implementation a set of low power reference signals (CSI-RSs) are overlapped in a first grid over multiple symbols for fine frequency estimation, and they are also overlapped as another grid over all subcarriers of an OFDM symbol for fine time domain estimation. This fifth implementation has been tested for a measured radio channel and is represented at FIG. 4A in the time domain direction for different UE speeds between 145 to 693 kmh. The achieved inter-code interference due to the time variations of the radio channel have been between −13 up to −40 dB for the given radio channel. For an error less than −20 dB one can conclude that the maximum speed should be in this case < about 300 kmh.

In this testing, for the given channel the frequency selectivity was dominant due to the direct application to the given grid of CSI-RSs, namely one sub tiled CSI-RS every sixth RE (=every 90 kHz) where the transmission basis was one PRB. The channel estimation quality was a bit poor; only <6.9 dB. For a signal to interference plus noise ratio (SINR) better than −20 dB the coherence bandwidth in this case would have to be increased by a factor of about ten, or equivalently the spacing between sub-tiled CSI-RSs would have to be reduced by a factor of 10. This result is expected as the measured channel was a typical urban macro non-line-of-sight channel with a high number of scatterers such as nearby buildings.

Figure 4B:
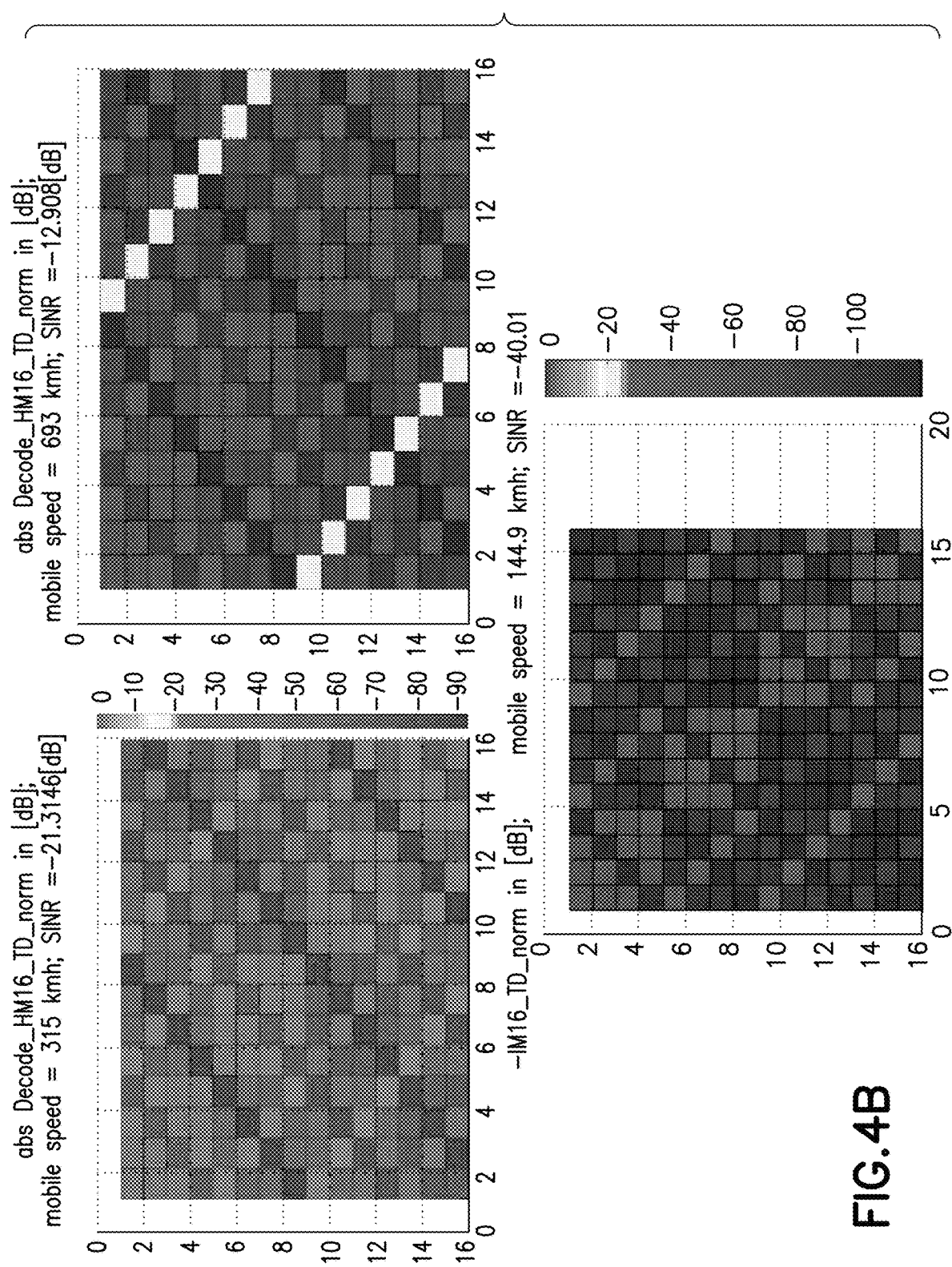
FIG. 4B are graphs illustrating sub-tiling according to the fifth implementation, into the time domain direction, for three different UE speeds for the measured CTF given at FIG. 4A.

FIG. 4B illustrates for three different UE speeds (ranging from 144 km/h to 693 km/h) sub-tiling into the time domain direction for an allocation of 4 times 14 CSI-RS per 1 millisecond subframe and a length 16 Hadamard code using the fifth implementation of sub-tiling described above. For the measured channel transfer function (CTF, the Fourier transform of the channel impulse response) given at FIG. 4A, the graphs of FIG. 4B show an achieved inter code interference of −40, −20 and −13 dB.

Figure 4C:
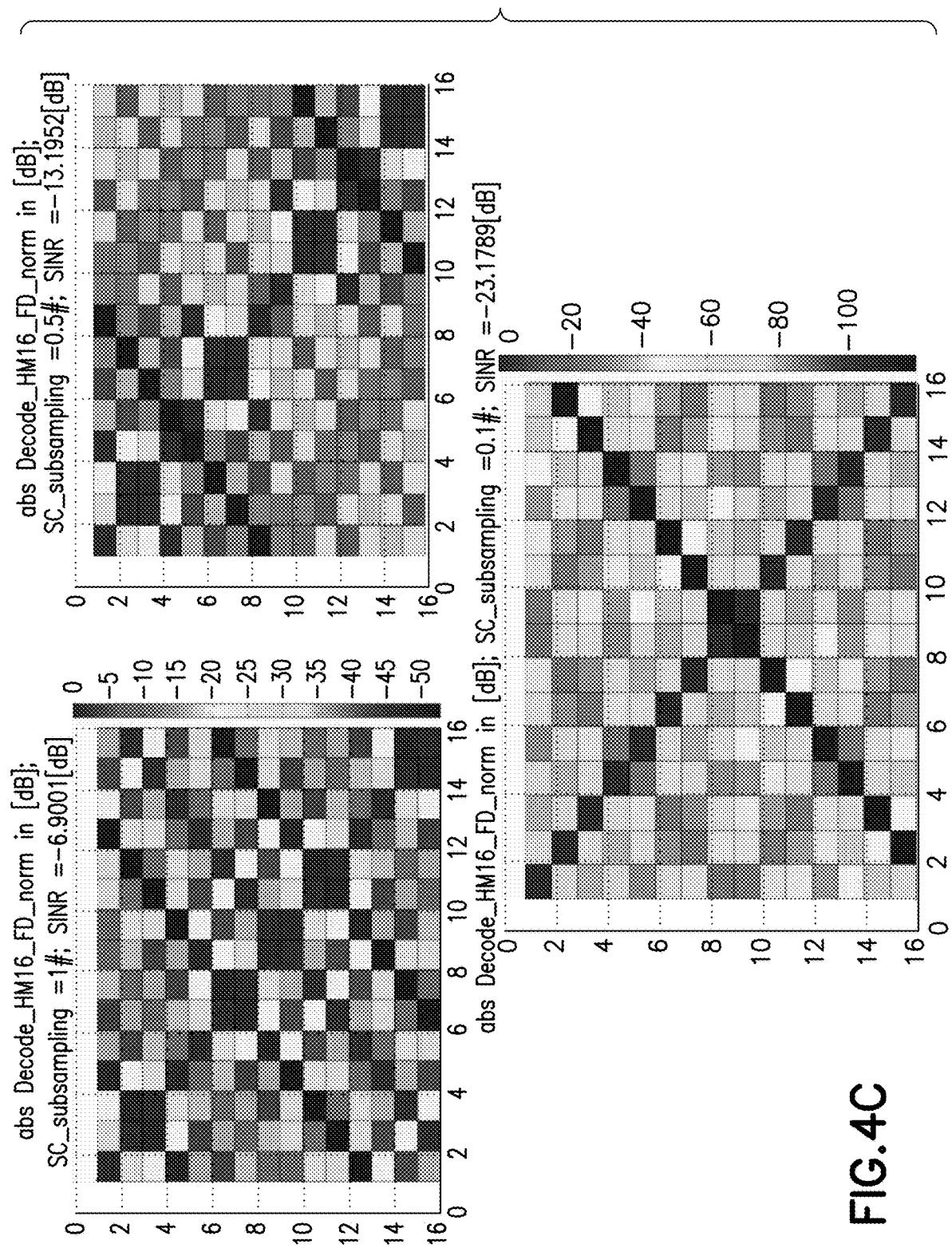
FIG. 4C are graphs illustrating sub-tiling according to the fifth implementation, into the frequency domain direction, for three different channel interpolations for the measured CTF given at FIG. 4A.

FIG. 4C illustrates for three different channel interpolations (ranging from 1 to 5 and 10) sub-tiling into the frequency domain direction for an allocation of 4 times 14 CSI-RS per 1 millisecond subframe with 2 CSI-RSs per PRB (every 90 kHz) and a length 16. Hadamard code. For the measured CTF given at FIG. 4A, the graphs of FIG. 4C show an achieved inter code interference of −23, −13 and −6.9 dB.

Figure 5A:
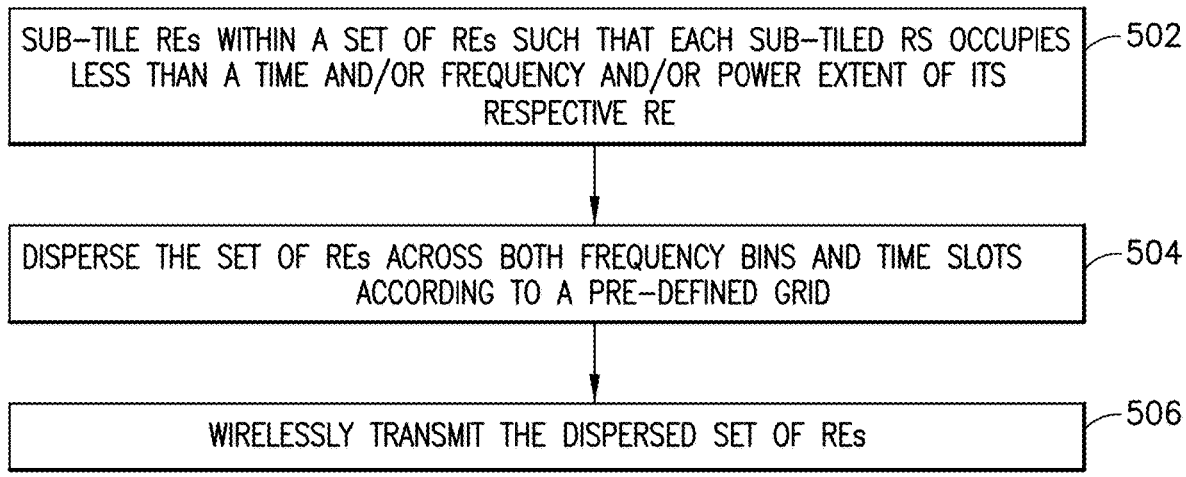
FIGS. 5A-B are process flow diagrams summarizing certain aspects of the invention from the perspective of a network radio access node/base station and of a user equipment/mobile device, respectively.

FIG. 5A is a flow diagram from the perspective of the radio network and summarizes some of the above features described more particularly above. More particularly FIG. 5A is from the perspective of the radio network access node such as a base station eNB or other type of network access point that in the above examples sub-tiles the CSI-RSs within certain REs and disperses those REs within the PRB it sends to the UEs. At block 502 the access node sub-tiles reference signals [such as for example channel state information reference signals (CSI-RSs)] within a set of resource elements (REs) such that each sub-tiled RS occupies less than a time and/or frequency and/or power extent of its respective RE. The power extent may also be referred to as a power budget. At block 504 the access node disperses that set of REs across both frequency bins and time slots according to a pre-defined grid. The order of blocks 502 and 504 is not particularly relevant; knowing the grid (example at FIG. 2A) for the set of REs in advance the access node can place the REs of the set in their proper locations and fill them with the sub-tiled RSs afterwards. Now the access node can transmit it at block 506.

In the non-limiting examples above the pre-defined grid at block 504 can be published or signalled, and as mentioned above FIG. 2A gives an example of such a grid. Though the dots in FIG. 2A specifically represent the sub-tiled CSI-RSs, the grid in this case would be for the REs in which those dots lie, regardless of how the individual CSI-RSs are sub-tiled within those individual REs of the set. Such a grid may be defined in a published specification for the radio access technology employing these teachings so the access node and UEs will know it without specific network signaling, or if signaling is used the grid may be adapted according to current channel conditions. Using such a grid enables the access node to repeat the method of FIG. 5A for a plurality of consecutive transmission bases using the same grid. As noted above, in order for the UE to properly select which of the sub-tiled CSI-RSs to accumulate and combine for its use in making a channel estimate, the access node may also periodically (not consecutively) transmit a plurality of other CSI-RSs that are dispersed according to a second grid where each of these other CSI-RSs occupy one entire RE. The UEs can estimate their channel conditions from these full-RE CSI-RSs and then choose to accumulate the sub-tiled CSI-RSs that are most suitable for those estimated channel conditions. The example rectangles 210, 212 and 214 at FIG. 2A show different sub-tiled CSI-RS accumulations (subsets) for different channel conditions.

In this regard, the access node performing the steps of FIG. 5A need not send any of instructions to any user equipment (UE) as to which sub-tiled RSs that respective UE should or must combine to make a channel estimate. In one non-limiting embodiment the selection of which sub-tiled RSs of a given transmission basis to accumulate and combine in a given subset is autonomous with the UE.

Sub-tiling the RSs in the REs of the set of REs noted at step 502 gives the access node the option of adding user data to those same REs. While the majority of the network's transmission will be user data, the access node may also have other control signaling apart from the sub-tiled RSs to send, and so the REs with the sub-tiled RSs may additionally comprise sub-tiled user data and/or sub-tiled control signaling where this control signaling is characterized as being other than reference signals used for channel estimation.

In the OFDM example above the time and frequency extent of each RE noted at block 502 is defined by one symbol and one sub-carrier frequency bin, respectively. In this case each of the sub-tiled RSs would occupy less than one symbol and/or less than one sub-carrier frequency bin. The sub-tiled RS may be orthogonalized with the sub-tiled user data and/or the sub-tiled control signaling; for example in the modulation domain the sub-tiled RS may use the real/in-phase part and the sub-tiled user data may use the imaginary/quadrature-phase part of the symbol.

Above several different implementations were explored for exactly how to do the sub-tiling. One used an overlay code, another used a hierarchical code, another used an orthogonal spreading code such as a Hadamard code. Further, constant-amplitude zero-autocorrelation (CAZAC) codes and non-orthogonal spreading codes (similar to CDMA spreading codes) can also be used here. Each of these codes define the location of at least some of the sub-tiled RSs within their respective REs. As with the Hadamard code example, multiple codes will define the locations in a given PRB/transmission basis of all of the sub-tiled RSs within their respective RE.

Figure 5B:
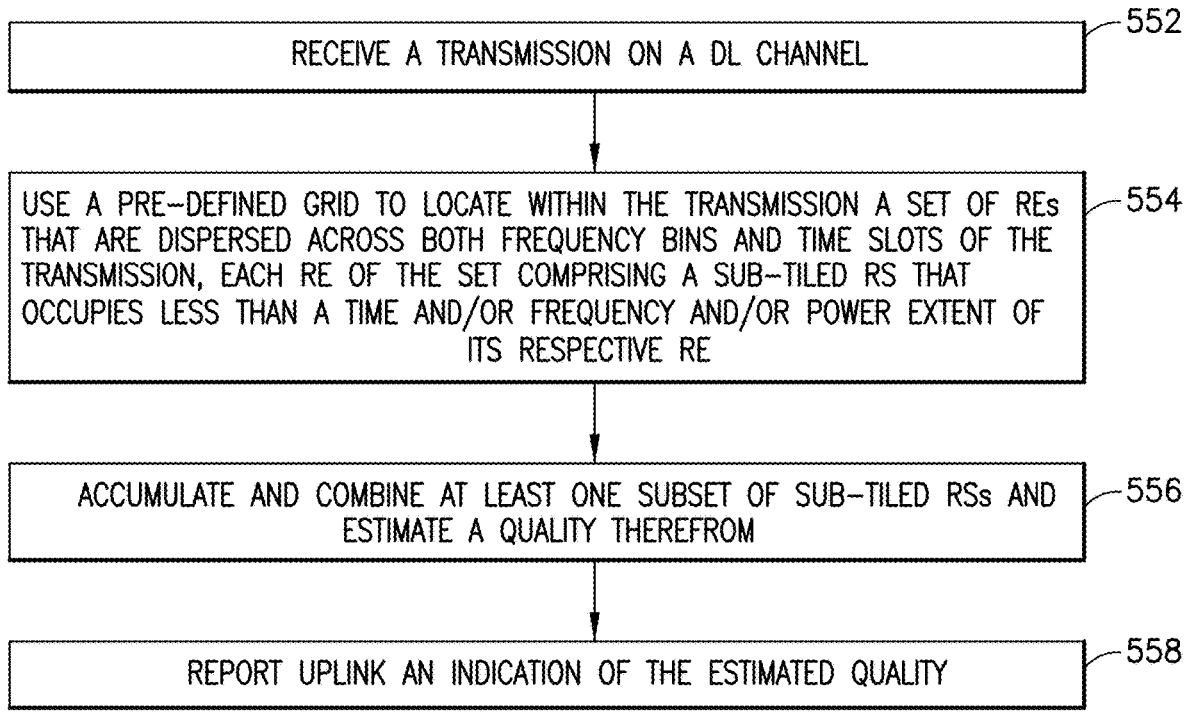

FIG. 5B is a flow diagram from the perspective of the user equipment (UE) and summarizes some of the above features described more particularly by the examples above, where the UE receives the transmission and then accumulates and combines the sub-tiled CSI-RSs that are within that transmission in a certain way to make its channel estimate. In this regard 'subset' of the sub-tiled RSs as used at FIG. 5B refers to less than all of the sub-tiled RSs. At block 552 the UE receives a transmission on a downlink channel and at block 5054 the UE uses a pre-defined grid to locate within the transmission a set of resource elements (REs) that are dispersed across both frequency bins and time slots of the transmission. This set is characterized in that each RE of this set comprises a sub-tiled RS (specifically for the examples above, a sub-tiled CSI-RS) that occupies less than a time and/or frequency and/or power extent of its respective RE. At block 556 the UE accumulates and combines at least one subset of sub-tiled RSs and estimates a quality from the sub-tiled RSs that are combined into that (at least one) subset. In the CSI-RS examples above that estimated quality was of the downlink channel of block 552. Then at block 558 the UE reports uplink an indication of the estimated quality, such as a CSI value if the RSs were CSI-RSs.

In one non-limiting example as further detailed above the pre-defined grid is predefined by being published or signaled to the UE from the radio network.

In another non-limiting example detailed above the at least one subset of block 556 is selected based on channel conditions including time and/or frequency coherence of the channel. In one embodiment that is preferred, all the sub-tiled CSI-RSs of the transmission are accumulated and combined via multiple different subsets, and the subsets are selected based on time/frequency coherence of the downlink channel over which the transmission was received. In one specific but non-limiting embodiment the multiple different subsets are characterized as follows. For a first case in which the accumulating and combining are in the frequency domain, the subsets encompass less than all frequency subcarriers across multiple symbols. For a second case in which the accumulating and combining are in the time domain, the subsets encompass comprise only portions of symbols over multiple frequency subcarriers.

The UE first establishing a connection and not yet having a solid grasp of its channel conditions can simply estimate it from its speed and fine tune as time progresses as it makes channel estimates per block 556, or in an example explored more fully above there can be periodic transmissions prior to the one at block 552 that each comprise a plurality of other CSI-RSs that each occupy one entire RE. In this case the UE would estimate the time and/or frequency coherence of its channel from one or more of those other (full-RE) CSI-RSs.

As mentioned above for certain embodiments of FIG. 5A, the UE performing the steps of FIG. 5B can select the at least one subset at block 556 autonomously, in the absence of instructions from the access node that sent the transmission of block 552 as to which sub-tiled RSs the UE should or must combine in a given subset at block 558 to make its quality estimate. And also as further detailed above, each RE of the set of REs at block 554 can further comprise, in addition to a sub-tiled RS, sub-tiled user data and/or sub-tiled control signaling (particularly control signaling that is other than reference signals used for channel estimation) and the sub-tiled RS can be orthogonalized with the sub-tile user data in the RE.

And as more particularly described above the UE can find which sub-tile of the REs in the set/grid is the RS sub-tile by employing an overlay code, and/or a hierarchical code, and/or an orthogonal or non-orthogonal spreading code.

Any or all of these aspects of the invention with respect to either or both of FIG. 5A and FIG. 5B can be embodied as a computer readable memory tangibly storing a computer program that when executed causes a host access node or mobile device/UE to perform the actions described in those respective figures.

These teachings can further be embodied as an apparatus, such as an access node for the case of FIG. 5A and a mobile device/UE for the case of FIG. 5B; or components thereof. Such apparatus can comprise at least one processor and at least one memory storing an executable computer program. In this embodiment the at least one processor is configured with the at least one memory and the computer program to cause the apparatus to perform the actions described above for FIG. 5A or for FIG. 5B as the case may be.

Each of FIGS. 5A-B themselves can be considered as an algorithm, and more generally represents steps of a method, and/or certain code segments of software stored on a computer readable memory or memory device that embody the respective FIG. 5A-B algorithm for implementing these teachings from the perspective of that respective device (base station or similar radio network access node, or UE). In this regard the invention may be embodied as a non-transitory program storage device readable by a machine such as for example one or more processors of a radio network access node or UE, where the storage device tangibly embodies a program of instructions executable by the machine for performing operations such as those shown at FIGS. 5A-B and detailed above.

Further, these teachings can additionally be extended to other types of reference signals. As one example, the discussions for 5G consider beam reference signals (BRSs) that are used to get a first estimate of beams that are swept for high RF frequencies. 5G is to use a mutual matching of transmit beam to receive beam, and there are expected to be far more such beams in 5G than in 4G so as to better support massive MIMO. Prior to 5G, typically there would be only one beam active at a time to achieve sufficient beamforming gain, and so it was needed to spread the reference signal per beam over frequency. But in the 5G frequency range (below 6 GHz) we can have more than one or even all beams active simultaneously. For harmonization reasons the BRSs used in the cmWave regime may be re-used in 5G so these will be limited to a TDMA allocation as well. Sub-tiling as described herein can be readily extended to these BRSs, for example by using the TDMA BRSs to get a first estimate and do a frequency selective CSI estimation in case all (or at least multiple) beams are active simultaneously.

FIG. 2B is a plan view similar to FIG. 2A but illustrating an example for applying sub-tiling to beam reference signals (BRSs) and beam refinement reference signals (BRRSs) that are expected to be transmitted downlink in the 5G new radio system and used for various purposes such as measurements for beam status reports the UEs are to send uplink. But unlike FIG. 2A there is shown at FIG. 2B multiple distinct BRS transmissions 250 prior to transmission of the BRRSs in a grid 260. FIG. 2B shows sub-tiling applied for BRS and BRRS combining, where the BRSs are transmitted in TDMA since the eNB might use hybrid beamforming so that only one beam at a time can be active.

In the example implementation of FIG. 2B the network transmits the BRS for the beams one after the other in TDMA, shown at the left of FIG. 2B where BRSn for beam n is sent after BRS1 for beam 1. In this case the sub-tiled BRSs for a given beam are spread in the frequency domain, as shown for BRS1 by the subset 252 that includes two sub-tiled BRSs that combined are equivalent to a single conventional BRS, in this case BRS1 for beam 1. Since in the above assumption there is only one beam at a time active, obviously the BRS of different beams of the radio network access nodes/access points cannot be transmitted simultaneously. In this regard one option is to combine sub-tiled BRS reference signals together with either control or even with user data on the remaining sub-tiles of the subject RE. This is similar to sub-tiling user data or control information with the sub-tiled CSI-RSs as detailed above to more fully occupy a given RE of the set.

For below 6 GHz such as in the proposed 5G new radio system the BRRSs might potentially be transmitted simultaneously for all beams. In that case these BRRSs might be sub-tiled together on the same resource elements; that is, a given RE might have a sub-tile of BRRS1 and of BRRS2, and possibly also sub-tiled user data or control information for the case that the multiple BRRS sub-tiles do not fill that particular RE. In this regard there would be pre-defined common sets of REs that have the sub-tiled BRSs and BRRSs. The first set of REs is defined by a first grid and is shown by example in FIG. 2B by the dots of the ERS transmissions 250. The UE would use this first grid to find the REs of the first set and by accumulating and combining as detailed above (using subset 252 and similar for the other TDMA transmissions) and from those combinations the UE can get a first channel estimate per beam based on the BRS. The second set of REs is defined by a second grid and is shown by example in FIG. 2B by the dots of the ERRS grid 260. The UE can improve its first channel estimate made using only the BRSs by combining the BRS with the BRRS. FIG. 2B illustrates an improved frequency selectivity by such combining because some of the sub-tiled BRRSs are in higher frequency bins than any of the sub-tiled BRSs, and this enhanced frequency selectivity enables the first estimate to be refined.

A particular technical effect of the above combined BRS/BRRS approach is that it uses all of the relevant reference signals (BRS and BBRS) in the best possible way in dependence on which RSs are available first.

In this regard, from the network's perspective if we consider the RSs mentioned at FIG. 5A as BRSs, the set of REs of block 502 as a first set of REs and the pre-defined grid of block 504 as a first pre-defined grid such as shown in subset 252 of FIG. 2B, then for the above example the network access node would further sub-tile BRRSs within a second set of REs; disperse that second set of REs across both frequency bins and time slots according to a second pre-defined grid such as the BRRS grid 260 of FIG. 2B, and wirelessly transmit the dispersed second set of REs bearing the sub-tiled BRRSs after wirelessly transmitting the dispersed first set of REs bearing the sub-tiled BRSs.

And similarly from the perspective of the UE, the transmission at block 552 of FIG. 533 would be a first transmission; and the pre-defined grid, set of REs and RSs at block 554 would be a first pre-defined grid such as that shown in the rectangle 252 of FIG. 2B, a first set of REs and BRSs, respectively. For the BRS/BRRS example above, the UE would receive a second transmission subsequent to the first transmission then the UE would use a second pre-defined grid such as the BRRS grid 260 of FIG. 2B to locate within the second transmission a second set of resource elements (REs) that are dispersed across both frequency bins and time slots of the second transmission, each RE of the set comprising a sub-tiled ERRS that occupies less than a time and/or frequency and/or power extent of its respective RE. The UE would then accumulate and combine at least one subset of the sub-tiled BRRSs (not specifically shown at FIG. 2B but not unlike the subsets shown at FIG. 2A) for the purpose of refining the quality that is the UE's first estimated from only the combined sub-tiled BRSs. In this case what the UE reports at block 558 of FIG. 5B is an indication of the refined quality; it is not necessary that the UE inform the network of its first estimate if the UE knows in advance it will refine it with the additional BRRS information.

Figure 6:
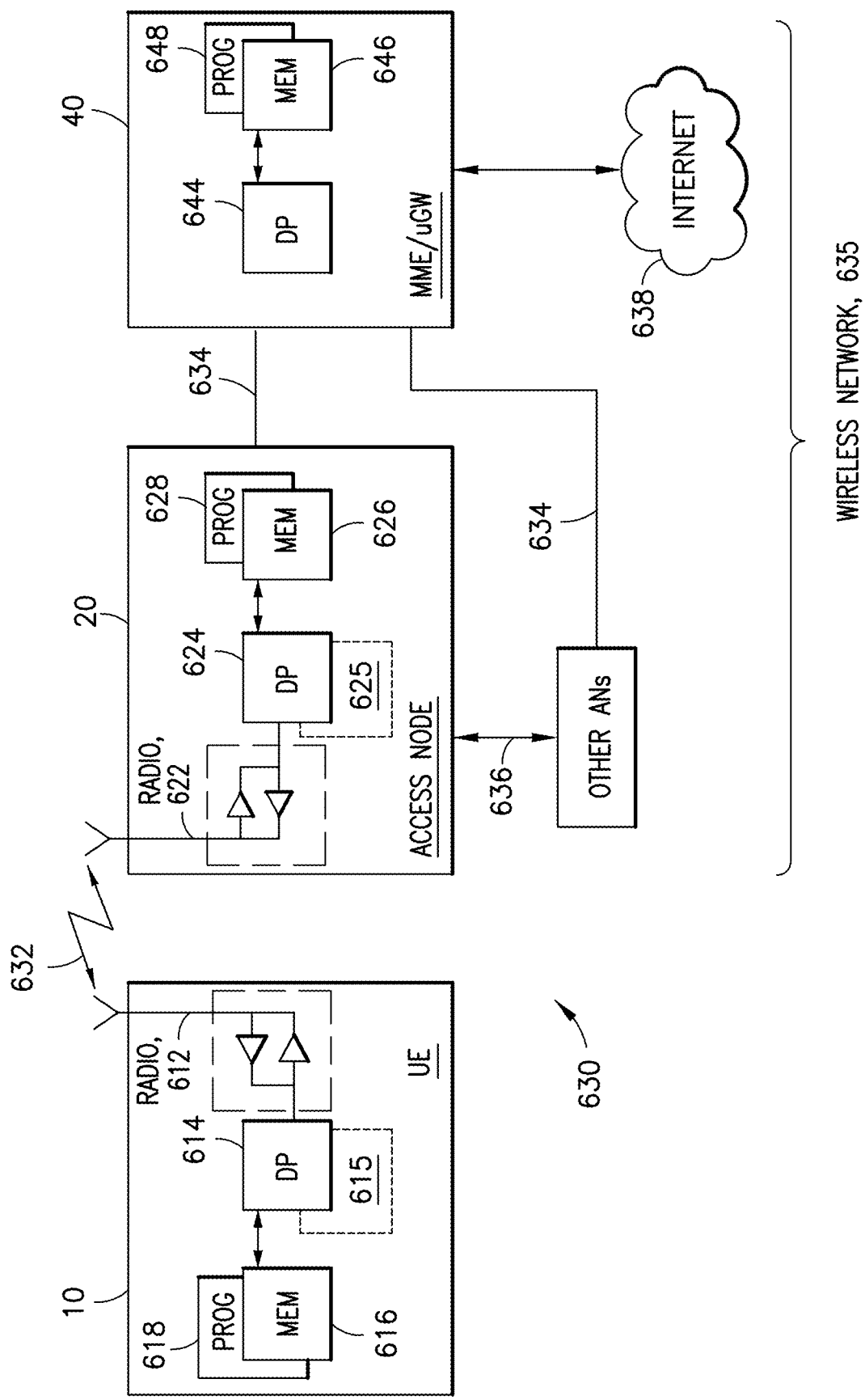
FIG. 6 is a diagram illustrating some components of a radio network access node/base station and a UE/mobile device, each of which are suitable for practicing various aspects of the invention.

FIG. 6 is a high level diagram illustrating some relevant components of various communication entities that may implement various portions of these teachings, including a base station identified generally as a radio network access node 20, a mobility management entity (MME) which may also be co-located with a user-plane gateway (uGW) 40, and a user equipment (UE) 10. In the wireless system 630 of FIG. 6 a communications network 635 is adapted for communication over a wireless link 632 with an apparatus, such as a mobile communication device which may be referred to as a UE 10, via a radio network access node 20. The network 635 may include a MME/Serving-GW 40 that provides connectivity with other and/or broader networks such as a publicly switched telephone network and/or a data communications network (e.g., the internet 638).

The UE 10 includes a controller, such as a computer or a data processor (DP) 614 (or multiple ones of them), a computer-readable memory medium embodied as a memory (MEM) 616 (or more generally a non-transitory program storage device) that stores a program of computer instructions (PROG) 618, and a suitable wireless interface, such as radio frequency (RF) transceiver or more generically a radio 612, for bidirectional wireless communications with the radio network access node 20 via one or more antennas. In general terms the UE 10 can be considered a machine that reads the MEM/non-transitory program storage device and that executes the computer program code or executable program of instructions stored thereon. While each entity of FIG. 6 is shown as having one MEM, in practice each may have multiple discrete memory devices and the relevant algorithm(s) and executable instructions/program code may be stored on one or across several such memories.

In general, the various embodiments of the UE 10 can include, but are not limited to, mobile user equipments or devices, cellular telephones, smartphones, wireless terminals, personal digital assistants (PDAs) having wireless communication capabilities, portable computers having wireless communication capabilities, specific-function personal devices (such as digital cameras, gaming devices, music storage and playback appliances, etc.) having wireless communication capabilities, Internet appliances permitting wireless Internet access and browsing, as well as portable units or terminals that incorporate combinations of such functions.

The radio network access node 20 also includes a controller, such as a computer or a data processor (DP) 624 (or multiple ones of them), a computer-readable memory medium embodied as a memory (MEM) 626 that stores a program of computer instructions (PROG) 628, and a suitable wireless interface, such as a RF transceiver or radio 622, for communication with the UE 10 via one or more antennas. The radio network access node 20 is coupled via a data/control path 634 to the MME 40. The path 634 may be implemented as an S1 interface. The radio network access node 20 may also be coupled to other radio network access nodes via data/control path 636, which may be implemented as an X5 interface.

The MME 640 includes a controller, such as a computer or a data processor (DP) 644 (or multiple ones of them), a computer-readable memory medium embodied as a memory (MEM) 646 that stores a program of computer instructions (PROG) 648.

At least one of the PROGs 618, 628 is assumed to include program instructions that, when executed by the associated one or more DPs, enable the device to operate in accordance with exemplary embodiments of this invention. That is, various exemplary embodiments of this invention may be implemented at least in part by computer software executable by the DP 614 of the UE 10; and/or by the DP 624 of the radio network access node 20; and/or, by hardware, or by a combination of software and hardware (and firmware).

For the purposes of describing various exemplary embodiments in accordance with this invention the UE 10 and the radio network access node 20 may also include dedicated processors 615 and 625 respectively.

The computer readable MEMs 616, 626 and 646 may be of any memory device type suitable to the local technical environment and may be implemented using any suitable data storage technology, such as semiconductor based memory devices, flash memory, magnetic memory devices and systems, optical memory devices and systems, fixed memory and removable memory. The DPs 614, 624 and 644 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 612 and 622) may be of any type suitable to the local technical environment and may be implemented using any suitable communication technology such as individual transmitters, receivers, transceivers or a combination of such components.

A computer readable medium may be a computer readable signal medium or a non-transitory computer readable storage medium/memory. A non-transitory computer readable storage medium/memory does not include propagating signals and may be, for example, but not limited to, an electronic, magnetic, optical, electromagnetic, infrared, or semiconductor system, apparatus, or device, or any suitable combination of the foregoing, Computer readable memory is non-transitory because propagating mediums such as carrier waves are memoryless. More specific examples (a non-exhaustive list) of the computer readable storage medium/memory would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

A communications system and/or a network node/base station may comprise a network node or other network elements implemented as a server, host or node operationally coupled to a remote radio head. At least some core functions may be carried out as software run in a server (which could be in the cloud) and implemented with network node functionalities in a similar fashion as much as possible (taking latency restrictions into consideration). This is called network virtualization. "Distribution of work" may be based on a division of operations to those which can be run in the cloud, and those which have to be run in the proximity for the sake of latency requirements. In macro cell/small cell networks, the "distribution of work" may also differ between a macro cell node and small cell nodes. Network virtualization may comprise the process of combining hardware and software network resources and network functionality into a single, software-based administrative entity, a virtual network. Network virtualization may involve platform virtualization, often combined with resource virtualization. Network virtualization may be categorized as either external, combining many networks, or parts of networks, into a virtual unit, or internal, providing network-like functionality to the software containers on a single system.

Below are some acronyms used herein:
3GPP third generation partnership project
BRS beam reference signal
ERRS beam refinement reference signals
BS base station (including NodeB and enhanced NodeB=eNB)
CRS common reference signal
CSI channel state information
CSI-RS channel state information reference signal
CTF channel transfer function
DL downlink
DM-RS demodulation reference signal
MCS modulation and coding scheme
MME mobility management entity
MIMO multiple-input multiple output
mmWave millimeter wave
NLOS non-line-of-sight
OFDM orthogonal frequency division multiplex
PDCCH physical downlink control channel
PDSCH physical downlink shared channel
PMI preceding matrix index
PRB physical resource block
RE resource element
RF radiofrequency
RS reference signal
SINR signal to interference and noise ratio
SU-MIMO single-user MIMO
TDMA time division multiple access
UE user equipment
UL uplink

What is claimed is:

1. A method comprising:
   receiving a transmission on a downlink channel;
   using a predefined grid of resource elements occupying part of a resource block to locate within the transmission a plurality of reference signals allocated to a plurality of resource element sub-tiles dispersed across both time slots and frequency bins of a set of resource elements included in the predefined grid, each resource element in the resource block occupying a specific time slot and a specific frequency bin, each time slot and frequency bin having a preselected extent in time and frequency, respectively, wherein each resource element sub-tile occupies less than at least one of the preselected extent in time of the specific time slot and the preselected extent in frequency of the specific frequency bin of a resource element in the set of resource elements included in the predefined grid so as to occupy only a portion of the resource element while leaving a remaining portion of the resource element having the resource element sub-tile available for other transmissions, said reference signals allocated to resource element sub-tiles being sub-tiled reference signals;
   accumulating and combining at least one subset of the sub-tiled reference signals and estimating therefrom a quality; and
   reporting uplink an indication of the estimated quality.

2. The method as claimed in claim 1, wherein the at least one subset is selected based on channel conditions including time and/or frequency coherence of the downlink channel.

3. The method as claimed in claim 2, wherein the reference signals are channel state information reference signals, the estimated quality is of the downlink channel, and all the sub-tiled channel state information reference signals of the transmission are accumulated and combined via multiple different subsets.

4. The method as claimed in claim 3, wherein the multiple different subsets are characterized by:

for a first case, wherein the accumulating and combining are in the frequency domain, the subsets encompass less than all frequency subcarriers across multiple symbols; or for a second case, wherein the accumulating and combining are in the time domain, the subsets encompass only portions of symbols over multiple frequency subcarriers.

5. The method as claimed in claim 2, wherein the reference signals are channel state information reference signals, the estimated quality is of the downlink channel, and the method further comprises:

prior to receiving the transmission, receiving a plurality of other channel state information reference signals, each occupying one entire resource element of an earlier transmission, wherein the time and/or frequency coherence of the channel is estimated from at least one of the other channel state information reference signals.

6. The method as claimed in claim 2, wherein the method is executed by a user equipment and the subset is selected by the user equipment in the absence of instructions from an access node from which the transmission was received as to which sub-tiled reference signals the user equipment should or must combine in a given subset to estimate the quality.

7. The method as claimed in claim 1, wherein each resource element of the set of resource elements further comprises sub-tiled user data and/or sub-tiled control signaling other than reference signals, said sub-tiled user data being user data allocated to at least one resource element sub-tile and said sub-tiled control signaling being control signaling allocated to at least one resource element sub-tile.

8. The method as claimed in claim 7, wherein, within a given resource element of the set of resource elements, the sub-tiled reference signal is orthogonalized with the sub-tiled user data and/or the sub-tiled control signaling.

9. The method as claimed in claim 1, wherein a location of at least some of the sub-tiled reference signals within their respective resource element is defined by one of:

an overlay code;
a hierarchical code;
an orthogonal spreading code; or
a non-orthogonal spreading code.

10. The method as claimed in claim 1, wherein the transmission is a first transmission, the pre-defined grid is a first pre-defined grid, the set of resource elements is a first set of resource elements and the reference signals are beam reference signals, and the method further comprises:

receiving a second transmission subsequent to the transmission;

using a second predefined grid of resource elements occupying part of a resource block to locate within the second transmission a plurality of beam refinement reference signals allocated to a second plurality of resource element sub-tiles dispersed across both time slots and frequency bins of a second set of resource elements included in the second predefined grid, wherein each resource element sub-tile in the second set of resource elements occupies less than at least one of the preselected extent in time of the specific time slot and the pre-selected extent in frequency of the specific frequency bin of a resource element in the second set of resource elements; and accumulating and combining at least one subset of the sub-tiled beam refinement reference signals to refine the quality estimated from the at least one subset of the sub-tiled beam reference signal, wherein the indication of the estimated quality reported uplink is an indication of the refined quality.

11. An apparatus comprising:

at least one computer-readable memory storing executable computer program instructions; and at least one processor, wherein the computer-readable memory with the computer program instructions is configured, with the at least one processor, to cause the apparatus to at least:

receive a transmission on a downlink channel;

use a predefined grid of resource elements occupying part of a resource block to locate within the transmission a plurality of reference signals allocated to a plurality of resource element sub-tiles dispersed across both time slots and frequency bins of a set of resource elements included in the predefined grid, each resource element in the resource block occupying a specific time slot and a specific frequency bin, each time slot and frequency bin having a preselected extent in time and frequency, respectively, wherein each resource element sub-tile occupies less than at least one of the preselected extent in time of the specific time slot and the preselected extent in frequency of the specific frequency bin of a resource element in the set of resource elements included in the predefined grid so as to occupy only a portion of the resource element while leaving a remaining portion of the resource element having the resource element sub-tile available for other transmissions, said reference signals allocated to resource element sub-tiles being sub-tiled reference signals;

accumulate and combine at least one subset of the sub-tiled reference signals and estimating therefrom a quality; and report uplink an indication of the estimated quality.

12. The apparatus as claimed in claim 11, wherein the at least one subset is selected based on channel conditions including time and/or frequency coherence of the downlink channel.

13. The apparatus as claimed in claim 12, wherein the reference signals are channel state information reference signals, the estimated quality is of the downlink channel, and all the sub-tiled channel state information reference signals of the transmission are accumulated and combined via multiple different subsets.

14. The apparatus as claimed in claim 13, wherein the multiple different subsets are characterized by:

for a first case, wherein the accumulating and combining are in the frequency domain, the subsets encompass less than all frequency subcarriers across multiple symbols; or for a second case, wherein the accumulating and combining are in the time domain, the subsets encompass only portions of symbols over multiple frequency subcarriers.

15. The apparatus as claimed in claim 12, wherein the reference signals are channel state information reference signals, the estimated quality is of the downlink channel, and the computer-readable memory with the computer program instructions is configured with the at least one processor to cause the apparatus further to:

prior to receiving the transmission, receive a plurality of other channel state information reference signals, each occupying one entire resource element of an earlier transmission, wherein the time and/or frequency coherence of the channel is estimated from at least one of the other channel state information reference signals.

16. The apparatus as claimed in claim 12, wherein the apparatus includes a user equipment and the subset is selected by the user equipment in the absence of instructions from an access node from which the transmission was received as to which sub-tiled reference signals the user equipment should or must combine in a given subset to estimate the quality.

17. The apparatus as claimed in claim 11, wherein each resource element of the set of resource elements further comprises sub-tiled user data and/or sub-tiled control signaling other than reference signals, said sub-tiled user data being user data allocated to at least one resource element sub-tile and said sub-tiled control signaling being control signaling allocated to at least one resource element sub-tile.

18. The apparatus as claimed in claim 17, wherein, within a given resource element of the set of resource elements, the sub-tiled reference signal is orthogonalized with the sub-tiled user data and/or the sub-tiled control signaling.

19. The apparatus as claimed in claim 11, wherein a location of at least some of the sub-tiled reference signals within their respective resource element is defined by one of:
   an overlay code;
   a hierarchical code;
   an orthogonal spreading code; or
   a non-orthogonal spreading code.

20. The apparatus as claimed in claim 11, wherein the transmission is a first transmission, the pre-defined grid is a first pre-defined grid, the set of resource elements is a first set of resource elements and the reference signals are beam reference signals, and the computer-readable memory with the computer program instructions is configured with the at least one processor to cause the apparatus further to:
   receive a second transmission subsequent to the transmission;
   use a second predefined grid of resource elements occupying part of a resource block to locate within the second transmission a plurality of beam refinement reference signals allocated to a second plurality of resource element sub-tiles dispersed across both time slots and frequency bins of a second set of resource elements included in the second predefined grid, wherein each resource element sub-tile in the second set of resource elements occupies less than at least one of the preselected extent in time of the specific time slot and the pre-selected extent in frequency of the specific frequency bin of a resource element in the second set of resource elements; and
   accumulate and combine at least one subset of the sub-tiled beam refinement reference signals to refine the quality estimated from the at least one subset of the sub-tiled beam reference signal,
   wherein the indication of the estimated quality reported uplink is an indication of the refined quality.

* * * * *